United States Patent Office 3,377,153
Patented Apr. 9, 1968

3,377,153
PROCESS OF AMMONIATING AN ACIDULATED PHOSPHATE ROCK TO PREPARE A SLURRY FERTILIZER
Casimer C. Legal, Jr., Elkridge, and Alvin Richmond, Baltimore, Md., assignors to W. R. Grace & Co., New York, N.Y., a corporation of Connecticut
No Drawing. Filed Apr. 14, 1964, Ser. No. 359,794
2 Claims. (Cl. 71—37)

This invention relates to fertilizer. More specifically, it relates to a method for producing slurry fertilizers.

In summary, this invention is directed to a method of preparing slurry fertilizer comprising treating phosphate rock with an acid selected from the group consisting of nitric acid, phosphoric acid, and mixtures of phosphoric and nitric acids and adding the thus acidulated phosphate rock to a neutralization mixture while agitating said neutralization mixture and ammoniating by simultaneously adding liquid anhydrous ammonia at such rate as to maintain the pH of the resulting slurry within the range of about 4.5–9, said slurry composition consisting essentially of at least 4%, by weight, of nitrogen values measured as N, at least 10%, by weight, of available phosphorus values measured as $P_2O_5$, substantially stable and substantially non-settling, readily sprayable, drying to readily discernible splatters on spraying, having a specific gravity of about 1.3–1.6.

Preferred embodiments of this invention include: (1) Conducting the ammoniation while maintaining the pH of the resulting slurry within the range of about 5.5–8.5 (and, for optimum results, within the range of about 6.5–7.5). (2) Adding an anionic surface active agent equivalent to about 0.1–0.2% of the weight of the phosphate rock simultaneous to the addition of said rock during the acidulation step, thereby preventing the formation of excessive foam. (3) Adding $K_2O$ values to the slurry by adding (i.e., dissolving and suspending) a salt selected from the group consisting of KCl and $K_2SO_4$ to said slurry. Said potassium salt can be added during the ammoniation step or subsequent to said step. (4) Replacing at least a portion of the phosphate rock and phosphoric acid with triple super phosphate. (5) Adjusting the slurry fertilizer to a substantially neutral pH (i.e., pH 6.5–7.5), thereby rendering said fertilizer substantially non-corrosive to mild steel apparatus. (6) Drying and crushing or pulverizing recovered slurry fertilizer before applying said fertilizer to the soil. (7) Drying and granulating the recovered slurry fertilizer before applying said fertilizer to the soil. (8) Adding an anionic surface active agent equivalent to about 0.1–0.4% of the weight of the phosphate rock simultaneous to the addition of said rock during the acidulation step, thereby preventing the formation of excessive foam.

It is known that fertilizers have been prepared by digesting phosphate rock with nitric acid, phosphoric acid, or mixtures of said acids and subsequently neutralizing the acidulated rock with ammonia. The resulting complex fertilizers are called "slurry fertilizers." If desired, $K_2O$ values can be added to said slurry fertilizers by adding potassium salts, e.g., KCl or $K_2SO_4$, during or after neutralization. Said slurry fertilizers can be applied by spraying onto the soil. Alternatively, said fertilizers can be dried and granulated or dried and crushed or pulverized, if necessary, before being applied to the soil.

In the process of this invention slurry fertilizers are prepared by reacting finely ground (e.g., ca. 45–65%, by weight, minus 200 mesh, U.S. standard) ca. 90% minus 100 mesh, and ca. 100% minus 60 mesh, phosphate rock with an acid selected from the group consisting of $HNO_3$, $H_3PO_4$, and mixtures of said acids. The resulting acidulate is ammoniated by adding said acidulate to a neutralization mixture of pH about 4.5–9 (said mixture can be a heel from a previous run or a solution of ammonia in water) while simultaneously adding anhydrous liquid ammonia at such rate as to maintain the pH of the resulting slurry within the range of about 4.5–9. In no instance should the pH of said mixture be allowed to drop below about 4.5. The preferable pH range is about 5.5–8.5 and the optimum pH range is about 6.5–7.5; however, excellent results have been obtained in the pH range of 4.5–5.5. If the pH of the neutralization mixture drops below about 4.5 the mixture becomes thick and loses its free-flowing properties, thereby making it necessary to supply a motor or other driving means of very high horsepower to agitate the mixture until sufficient ammonia has been added to adjust the pH above about 4.5 and preferably above about 5.5.

Potash, $K_2O$, values can be added to the slurry fertilizer by adding a $K_2O$ source, e.g., KCl or $K_2SO_4$, to the slurry. Said $K_2O$ source can be added to the neutralization mixture simultaneous to the addition of ammonia and acidulated phosphate rock of said $K_2O$ source can be added subsequent to the ammoniation of the acidulate (i.e., the acidulated phosphate rock). In either instance, the addition of said $K_2O$ source does not affect the viscosity of the slurry fertilizer either to make said slurry thicker or thinner.

Since the product obtained by the action of phosphoric acid on phosphate rock is equivalent to triple super phosphate (TSP) before the TSP has been dried, it is readily apparent that TSP can be substituted, on the basis of its phosphate content, for phosphoric acid-treated phosphate rock in the process of this invention.

Nitric acid analyzing about 30–57% $HNO_3$, by weight, can be used in the process of this invention. Phosphoric acid analyzing at least about 30% $P_2O_5$, by weight, has given excellent results when used in the process of this invention. However, phosphoric acid analyzing at least about 54% $P_2O_5$, by weight, is preferable. The phosphoric acid used in this process can be either wet process acid or furnace grade acid. The acid used in the process of this invention can be nitric acid, phosphoric acid, or a mixture of said acids. Also, as stated supra, TSP can be substituted in whole or in part, for both phosphate rock and phosphoric acid.

Slurry fertilizers prepared by the process of this invention contain at least 95% of their total $P_2O_5$ in citrate soluble form. Typical slurries contain about 97% of their $P_2O_5$ in citrate soluble form and slurries containing 99% of their total phosphate in citrate soluble form are not uncommon.

Under the process of this invention there is no reversion of $P_2O_5$ to the citrate insoluble form, and no difficulty is encountered in agitating the mixture either during the process of manufacture or during storage subsequent to manufacture and previous to application to the soil. None of the thin-thick-thin-thick-thin stages which complicate the process of manufacture when slurry fertilizers are prepared by the methods of the prior art are encountered in the process of this invention in which the pH of the neutralization mixture never drops below about 4.5. This is a truly surprising and completely unobvious finding, because of the prior art teaches that slurry fertilizers thicken at a pH of about 4–6.

The product of this invention is a composition consisting essentially of at least 4%, by weight, of nitrogen values measured as N, at least 10%, by weight, of available phosphorus values measured as $P_2O_5$, substantially stable and substantially non-settling, readily sprayable, drying to readily discernable splatters on spraying, having a specific gravity of about 1.3–1.6, and having a total plant food content of 14–50%, by weight.

Another advantage of the process of this invention over the prior art is that production capacity is increased, because reaction time is less in this process than in the processes of the prior art. This results from the fact that slow ammoniation of the acid mixture is not a factor in the instant process. Previous to this invention, slow ammoniation was necessary to maintain fluidity during the thickening stages.

As a further advantage of the process of this invention, higher analysis slurry fertilizers can be made by said process than could be made by the processes of the prior art. Previously, when an attempt was made to prepare higher analysis slurry fertilizer, the product would set and become hard during one of the thickening stages, due to the high concentration of solids in suspension. Since the process of this invention has no thickening stages, said process can be used to produce high analysis fertilizer slurries with $N:P_2O_5:K_2O$ weight ratios of 1:1:1, 1:2:1, 1:2:2, 1:2:3, 1:3:4, 2:1:1, and 1:3:1. Typical of such products are: 10–10–10, 7–14–7, 7–14–14, 6–12–18, 5–15–20, 18–9–9, and 10–30–10 slurries with about 20–35% water, by weight. If desired, the potassium values can be omitted, thereby giving $N–P_2O_5$ slurries, e.g., 13–39–0, 10–30–0, 18–9–0, and the like.

All of the above-listed products, despite their high solids content, are sufficiently fluid to be readily pumped and sprayed on the soil. They have densities in the range of about 1.3–1.6. In general, said slurries, when sprayed on the soil, dry to hard whitish "splatters," thereby providing a clear indication of the areas that have been sprayed and thereby reducing the danger of under-fertilization or over-fertilization.

The crux of this invention lies in the fact that during the ammoniation step the pH of the neutralization mixture is kept above about 4.5, preferably above about 5.5, thereby preventing the development of thin-thick-thin-thick-thin stages during production. While the slurries of the process of this invention never become too thick to process at pH's above about 4.5., we prefer a minimum pH of about 5.5 as an extra margin of safety in case an operator should feed ammonia into the system too slowly or acidulated rock too rapidly. Due to loss of ammonia at high pH's (e.g., pH's above about 8.5–9), the pH should be kept below about 9 and preferably below about 8 even though the reaction goes smoothly at said high pH's and thin-thick-thin stages never develop at any pH above about 4.5. For optimum results it is preferred to maintain the pH during ammoniation within the range of about 6.5–7.5, because the mixture, when maintained within this pH range does not corrode mild steel (from which we prefer to construct the reactor in which the acidulate is ammoniated), and substantially no ammonia is lost by volatilization. Also, to prevent corrosion of mild steel storage tanks, lines, transportation tanks, and spray lines and nozzles and to minimize the volatilization of ammonia from the product, it is preferred to maintain the pH of the product within the range of about 6.5–7.5. The pH of said product can be adjusted to about 6.5–7.5 by adding acidulated rock if the pH is above about 7.5 and by adding ammonia if the pH is below about 6.5.

It is generally preferred to apply the fertilizer prepared by the process of this invention by spraying the slurry fertilizer directly onto the soil. However, the slurry can be dried and granulated or dried and crushed or pulverized (if necessary). The resulting granules or particles can then be applied to the soil.

Granulation can be accomplished by standard techniques using such standard apparatus as a rotary granulator or a pug mill. Still other suitable apparatus will be apparent to those skilled in the art. Drying can be accomplished by using standard techniques and such standard apparatus as a rotary drier or a Rotolouvre. Still other suitable drying apparatus will be apparent to those skilled in the art. When granulating or when drying and crushing the solid product, said solid is screened and fine particles plus crushed oversize particles are returned to the granulating or drying system.

The granulated product is a substantially dry fertilizer composition consisting essentially of granules passing an 8 mesh, U.S. standard, screen and retained on a 16 mesh screen, analyzing at least about 5%, by weight, of nitrogen values measured as N, at least about 12%, by weight, of available phosphorus values measured as $P_2O_5$, being substantially stable, substantially free-flowing and non-caking, having a bulk density of about 55–77 lbs. per cubic foot, said dry fertilizer composition having a total plant food content of about 17–70%, by weight.

The non-granular solid product (prepared by drying the aforesaid slurry fertilizer and crushing the thus dried fertilizer) is a substantially dry fertilizer composition consisting essentially of particles passing a 4 mesh, U.S. standard, screen and retained on a 16 mesh screen, analyzing at least about 5%, by weight, nitrogen values measured as N, at least about 12%, by weight, of available phosphorus values measured as $P_2O_5$, being substantially stable, substantially free-flowing and non-caking, having a bulk density of about 55–70 lbs. per cubic foot, and having a total plant food content of about 17–70%, by weight.

During research leading to the development of this invention, it was found that in the course of acidulating phosphate rock with nitric acid or with a mixture of wet process phosphoric acid and nitric acid, good conversion of $P_2O_5$ to an available form was achieved. However, upon ammoniation to a neutral pH by adding ammonia to the acidulated rock, a substantial portion of the $P_2O_5$ (typically up to 20% and sometimes up to 50%) reverted to a citrate insoluble form which is not useful as plant food. Also, the addition of ammonia to rock acidulated with wet process phosphoric acid containing substantial quantities of impurities, e.g., iron, fluorine, and silicon compounds, frequently caused the acidulated mixture to set up to a hard mass which could not be stirred with available stirring equipment.

It was discovered that if the acidulated rock is added to a neutralization mixture (which can be a solution of ammonia in water or a heel from a previous ammoniation conducted by this procedure) while simultaneously adding anhydrous liquid ammonia to maintain the pH at about 4.5–9.0, a slurry product was obtained which was free-flowing, non-thixotropic, and easily handled with conventional pumping and spraying equipment even when wet process phosphoric acid high in impurities was used to acidulate the phosphate rock. It was found that, in the process of this invention, substantially no reversion of $P_2O_5$ to the citrate insoluble form occurred in slurry fertilizer produced by this method, and the thin-thick-thin stages which plagued the ammoniation step of the prior art processes were avoided. It was also found that said reversion did not occur when slurry fertilizers produced by this process were dried and granulated.

Thus, the process and product of this invention fill a long felt need, viz.; a simple and rapid process for preparing a balanced $N—P_2O_5—K_2O$ slurry fertilizer from inexpensive readily available raw material, e.g., phosphate rock, wet process phosphoric acid, nitric acid, and ammonia; and a fertilizer slurry product of low water content and high $N—P_2O_5—K_2O$ content (especially with respect to a high available $P_2O_5$ assay), non-corrosive to mild steel equipment, and sufficiently fluid to be pumped and sprayed. Slurries prepared by this method have analyzed at least 4%, by weight, of nitrogen values measured as N and at least 10%, by weight, of available phosphorus values measured as $P_2O_5$ and have a total plant food content of 14–56%, by weight. Said slurries are substantially non-settling and readily sprayable; said slurries, when sprayed on the soil, dry to readily discernible splatters.

The invention is further illustrated by the following examples, in which each analysis is reported in percent by weight; said examples are illustrative only and do not limit the scope of the invention.

Example 1.—Preparation of approximately 5–15–20

Ingredients:

| | Quantity, g. |
|---|---|
| Triple Super Phosphate (TSP),[1] 46% $P_2O_5$ | 1300 |
| Nitric Acid, 57% $HNO_3$ (ca. 12.6% N) | 475 |
| Potassium Chloride, 62.5% $K_2O$ | 1300 |
| Anhydrous Liquid Ammonia | 190 |
| Water | 925 |

[1] The TSP passed through a 4 mesh, U.S. Standard, screen.

The reactor was a 4 liter stainless steel beaker with a cooling jacket. A 4 inch Cowles dissolver blade, connected with a variable speed electrically-driven motor was used to stir the reaction mixture. Temperature was read from a galvanometer attached to a thermocouple immersed in the reaction mixture.

About 300–450 g. of water (i.e., ca. ⅓–½ of the total water) and all of the nitric acid were added at ambient conditions to the beaker. The water was added to increase the volume of liquid, thereby reducing the viscosity of the reaction mixture. The TSP was added to the diluted acid by means of a Syntron vibrating type feeder of controllable speed while stirring the mixture in the beaker. Said mixture was a free-flowing slurry.

The thus produced acidulated phosphate slurry was transferred from the beaker to an amply sized dispensing buret. The beaker was washed with a small amount (ca. 50 ml.) of water, and the rinse was added to the buret.

The remaining water (ca. 425–575 g.) was added to the empty beaker, and ammonia was passed into said beaker (via an ammonia flow meter) while stirring the solution in the beaker and measuring the pH of said solution with pH indicating paper. When said pH reached the basic side (i.e., the pH range of about 7.6–8.5) the acidulate in the buret was allowed to flow into the thus produced ammonia solution, or neutralization mixture, while continuing to pass ammonia into said mixture. The pH was read about every 45–60 seconds and maintained above about 5 and below about 9 (preferably about 6.5–7.5) at all times. Although the reaction proceeded smoothly at very high pH's (e.g., ca. above about 8.5 or 9) and no thin-thick-thin stages were encountered, it was observed that ammonia vapor is lost from the system when the pH is allowed to go higher than about 8–8.5. After adding all of the acidulate (acidulated TSP), the pH was adjusted to a substantially neutral range (i.e., ca. 6.5–7.5). This neutralization step is important, because, in commercial use, mild steel storage, transportation and application apparatus is used, and slurry fertilizer at a substantially neutral pH is substantially non-corrosive to mild steel apparatus; also, if the product is left on the basic side, e.g., above a pH of about 8 ammonia losses can occur, thereby rendering the process more costly and producing objectionable fumes.

During the course of the reaction the temperature rose steadily; hence, when the temperature reached about 77–82° C., cooling water was admitted to the reactor jacket. The reaction temperature was not permitted to exceed about 93° C.

Subsequent to the ammoniation of the acidulate by the above-described procedure, KCl was added over a period of a few (ca. 2–5) minutes while stirring the slurry. The rate of KCl addition was not critical. However, this salt must not be dumped in as one lot without stirring, because a substantial portion of the thus added KCl will neither dissolve nor suspend quickly, thereby resulting in a slurry product low in $K_2O$ values and in the accumulation of large lumps of solid KCl in the reaction vessel.

The product was a free-flowing slurry with a specific gravity of 1.6. Said slurry weighed 4080 g. and had the following analysis:

| | Percent |
|---|---|
| Total nitrogen (TN) | 5.1 |
| Total $P_2O_5$ (TPA) | 15.10 |
| Available $P_2O_5$ (APA) | 14.62 |
| Citrate insoluble $P_2O_5$ (CI) | 0.48 |
| $K_2O$ | 19.90 |
| $H_2O$ | 27.26 |

The viscosity of the slurry fertilizer product was determined with a Brookfield viscometer, model RVT. Said viscometer is described on page 4 of a bulletin entitled, "Brookfield Synchro-Electric Viscometer," published by The Brookfield Engineering Laboratories, Stoughton, Mass. Brookfield Viscometers are discussed by Bowles, Davie, and Todd, in a pamphlet entitled, "A Method for the Interpretation of Brookfield Viscosities." Said pamphlet is a reprint of an article which appeared in Modern Plastics magazine, published by Breskin Publications, 575 Madison Ave., New York 22, N.Y.

Using a spindle No. 6, the viscosity of said product at 75° F. was found to be:

| R.p.m. | Viscosity, cps. |
|---|---|
| 10 | 7000 |
| 20 | 5750 |
| 50 | 4200 |
| 100 | 2900 |

Example 2.—Preparation of approximately 6–12–18

Ingredients:

| | Quantity, g. |
|---|---|
| Phosphate rock, 34.4% $P_2O_5$ | 586 |
| Nitric acid, 57% $HNO_3$ | 856 |
| Phosphoric acid, 54% $P_2O_5$ | 516 |
| Potassium chloride, 62.5% KCl | 1174 |
| Anhydrous liquid ammonia | 185 |
| Water | 900 |
| Defoamer (sodium salt of sulfonated oleic acid) | 1–2 |
| Total reactants added | 4283 |

The apparatus and general procedure of Example 1 were used. However, in this instance, phosphate rock was substituted for TSP and a portion of the acid was added in the form of phosphoric acid. The phosphoric acid used was wet process acid made from Florida rock. This was a heavy, greenish black acid, known to contain many impurities.

The nitric acid and part (ca. 200–300 g.) of the water were charged into the reactor. These were followed by the phosphoric acid. (If desired, the sequence of addition of acids and water can be varied.) Addition of the phosphate rock (ca. 100% minus 60 mesh, U.S. standard) was then begun. This material was added over a period of about 5–7 minutes. Defoamer, of sulfonated oleic acid, sodium salt, was added continuously and slowly as the rock was charged into the beaker which served as the reactor. In addition to substantially decreasing the amount of foam produced, said defoamer substantially reduces the corrosivity of acidic slurry fertilizers to mild steel apparatus. Acidic slurry fertilizers are slurry fertilizers having pH's below about 6.5. Stirring was continued for 10–20 minutes after the last of the rock had been added to insure completion of the acidulation.

The acidulated slurry (acidulate) was transferred to a buret and the balance of the water (ca. 600–700 g.) was added to the beaker. Ammonia was passed into the beaker until a neutralization mixture was formed by bringing the pH of the resulting ammonia solution to about pH 8–9. When said pH was reached the acidulated slurry mixture in the buret and ammonia were simultaneously passed into the neutralization mixture. Adjustment of the two flows kept the pH within the range of about 4.5–9, thereby avoiding thin-thick-thin stages. The pH range of about 6.5–7.5 is preferred because it substantially prevents the loss of ammonia by vaporization from the system and renders the thus produced slurry substantially non-corrosive to mild steel apparatus. After all of the acidulated mixture had been added, the pH of the slurry in the beaker was adjusted to a substantially neutral range (i.e., ca. 6.5–7.5), and the KCl was added over a period of several (ca. 5–8) minutes while continuing to stir the slurry mixture. The resulting product weighed 4000 g. and analyzed:

| | Percent |
|---|---|
| TN | 6.22 |
| TPA | 12.30 |
| APA | 12.14 |
| CI | 0.16 |
| $K_2O$ | 18.06 |
| $H_2O$ | 31.20 |

The viscosity of the slurry fertilizer product was determined with a Brookfield viscometer, model RVT, at 75° F., spindle No. 3, and found to be as follows:

| R.p.m. | Viscosity, cps. |
|---|---|
| 10 | 2300 |
| 20 | 1350 |
| 50 | 740 |
| 100 | 480 |

Example 3.—Preparation of approximately 6–12–18

The procedure of Example 2 was repeated, but in this instance 1215 g. of red potassium chloride (ca. 60% $K_2O$) was used as the potash source. Said potassium chloride is an impure salt containing quantities of iron, fluorine, silicon, and other impurities, all of which are reputed in the art to vastly increase thickening of the phosphate slurry at a neutral or basic pH. The pH during the ammoniation step (i.e., when adding acidulate and ammonia simultaneously to the neutralization mixture) was kept within the range of about 4.5–9, preferably about 6.5–7.5. No thickening was encountered at any time. The slurry product weighed about 4050 g.; its analysis was substantially the same as that of the product obtained in Example 2.

Example 4.—Preparation of approximately 6–12–20

The general procedure of Example 3 was followed; however, in this instance 1360 g. of red potassium chloride (ca. 60% $K_2O$) was added to bring the $K_2O$ value up to formula. No thickening was observed during the preparation of the fertilizer. The slurry product weighed 4050 g. and analyzed:

| | Percent |
|---|---|
| TN | 6.00 |
| TPA | 12.40 |
| APA | 12.28 |
| CI | 0.12 |
| $K_2O$ | 19.66 |
| $H_2O$ | 25.84 |

The viscosity of the slurry fertilizer product was determined with a Brookfield viscometer, model RVT, at 75° F., spindle No. 5, and found to be as follows:

| R.p.m. | Viscosity, cps. |
|---|---|
| 10 | 6000 |
| 20 | 4300 |
| 50 | 2560 |
| 100 | 1640 |

Example 5.—Preparation of approximately 7–14–7

| Ingredients: | Quantity, g. |
|---|---|
| Phosphate rock, 34.4% $P_2O_5$ | 700 |
| Nitric acid, 57% $HNO_3$ | 1000 |
| Phosphoric acid, 54% $P_2O_5$ | 610 |
| Potassium chloride, red, ca. 60% $K_2O$ | 480 |
| Anhydrous liquid ammonia | 210 |
| Water | 1140 |
| Sulfonated oleic acid, sodium salt | 1–2 |

The general procedure of Example 3 was used; however, the quantities were adjusted to produce a 7–14–7 slurry fertilizer. No thickening was observed during the preparation of said slurry fertilizer. The final pH of the product was 7.2, and said product weighed 4000 g. and analyzed:

| | Percent |
|---|---|
| TN | 7.32 |
| TPA | 14.80 |
| APA | 14.76 |
| CI | 0.04 |
| $K_2O$ | 6.92 |
| $H_2O$ | 40.94 |

The viscosity of the slurry fertilizer product was determined with a Brookfield viscometer, model RVT, at 75° F., spindle No. 1, and found to be as follows:

| R.p.m. | Viscosity, cps. |
|---|---|
| 10 | 80 |
| 20 | 55 |
| 50 | 45 |
| 100 | 53 |

Example 6.—Preparation of approximately 7–14–14

The general procedure of Example 5 was used, except that 960 g. of red potassium chloride (ca. 60% $K_2O$) was used to reach the calculated formulation. No thickening occurred during the preparation of this fertilizer, analysis of the slurry product confirmed that it was approximately a 7–14–14 grade fertilizer (ca. 7.3% N, 14.7% APA, and 14.2% $K_2O$), and the citrate insoluble $P_2O_5$ was low (0.28%).

The viscosity of the slurry fertilizer product was determined with a Brookfield viscometer, model RVT, at 75° F., spindle No. 3, and found to be as follows:

| R.p.m. | Viscosity, cps. |
|---|---|
| 10 | 3400 |
| 20 | 2050 |
| 50 | 1120 |
| 100 | 730 |

Example 7.—Preparation of approximately 5–10–20

| Ingredients: | Quantity, g. |
|---|---|
| Phosphate rock, 34.4% $P_2O_5$ | 300 |
| Nitric acid, 57% $HNO_3$ | 375 |
| Phosphoric acid, 55.9% $P_2O_5$ | 570 |
| Potassium chloride, 62.5% KCl | 1305 |
| Anhydrous liquid ammonia | 182 |
| Water | 1453 |
| Sulfonated oleic acid, sodium salt ca. | 0.5 |

The general procedure of Example 2 was repeated using the ingredients listed above. The product was a slurry fertilizer having a final pH of 6.7 and analyzing:

| | Percent |
|---|---|
| TN | 5.04 |
| TPA | 10.50 |
| APA | 10.30 |
| CI | 0.20 |
| $K_2O$ | 19.87 |
| $H_2O$ | 14.24 |

The viscosity of the slurry fertilizer product was determined with a Brookfield viscometer, model RVT, at 114° F., spindle No. 3, and found to be as follows:

| R.p.m. | Viscosity, cps. |
|---|---|
| 10 | 1240 |
| 20 | 670 |
| 50 | 320 |
| 100 | 208 |

Subsequently, the viscosity of said product was determined at 75° F., using spindle No. 2, and found to be as follows:

| R.p.m. | Viscosity, cps. |
| --- | --- |
| 10 | 608 |
| 20 | 362 |
| 50 | 192 |
| 100 | 132 |

Example 8

About a 15-ton batch of approximately 7-14-14 slurry fertilizer was prepared from the following ingredients:

| Ingredients: | Quantity, lbs. |
| --- | --- |
| Phosphate rock, 34.4% $P_2O_5$ | 5250 |
| Nitric acid, 57% $HNO_3$ | 7500 |
| Phosphoric acid, 54% $P_2O_5$ | 4560 |
| Potassium chloride, red, 60% $K_2O$ | 7100 |
| Anhydrous liquid ammonia | 1550 |
| Water | 5800 |
| Sulfonated oleic acid, sodium salt ca. | 10 |

The phosphoric acid, nitric acid, and about half of the water were placed in an unjacketed stainless steel tank, provided with an agitator. The phosphate rock and the sodium salt of sulfonated oleic acid (defoamer) were added simultaneously to said tank over a period of about an hour while agitating the resulting mixture. The mixture was agitated for about 15 minutes after all of the rock had been added to assure complete acidulation of said rock.

In the meantime a neutralization mixture was prepared by adding the remainder of the water to a tarred mild steel tank and adding anhydrous liquid ammonia to said water until the pH of the resulting solution was about 7.5 (as measured by a pH meter). Said tank was water jacketed and provided with an agitator. The acidulate (acidulated phosphate rock slurry) was ammoniated by adding said slurry to said neutralization mixture while agitating said mixture and simultaneously adding anhydrous liquid ammonia to the system at such rate as to maintain the pH of the resulting slurry fertilizer within the range of about 6.5–7.5. During the ammoniation, cooling water was circulated through the jacket on the aforesaid tank, thereby keeping the temperature of the reaction mixture below about 90–95° C. After the ammoniation was completed, said tank and its contents were weighed.

The thus produced slurry fertilizer weighed about 15 tons. Analysis showed that said slurry was approximately a 7-14-14 fertilizer (7.3% N, 14.1% APA, 14.2% $K_2O$) suitable for application to fields for the fertilization of commercial farm crops and containing less than about 0.2% citrate insoluble $P_2O_5$.

The aforesaid slurry fertilizer was dried to the solid state using a rotary dryer; the solid product was removed from the dryer and screened. Particles passing a 4 mesh, U.S. standard, screen and retained on a 16 mesh, U.S. standard, screen were recovered as product. Particles passing the 16 mesh screen were recycled to the dryer, and particles retained on the 4 mesh screen were crushed and recycled to the screens.

Results of an analysis showed that the dried product was approximately a 10-20-20 fertilizer (10.3% N, 20.2% APA, 20.3% $K_2O$, 0.3% CI) low in citrate insoluble phosphate.

Example 9

The general procedure of Example 8 was repeated, but in this instance the slurry fertilizer was granulated in a pug mill. Granules passing an 8 mesh, U.S. standard, screen and retained on a 16 mesh, U.S. standard, screen were recovered as product. Particles passing the 16 mesh screen were recycled to the pug mill, and all particles retained on the 8 mesh screen were crushed and recycled to the screens.

Analysis of the recovered granular fertilizer showed that this material was a 10-20-20 fertilizer (10.2% N, 20.3% APA, 19.9% $K_2O$, 0.2 CI) low in citrate insoluble phosphate.

In Examples 8 and 9, the phosphate rock was fed by gravity via a chute from an elevated storage bin located above the acidulation tank. Other methods of adding said rock, including conveyor belts, screw conveyors, and the like will be readily apparent to those skilled in the art. In said examples, the defoamer, an aqueous solution, was fed by gravity via a calibrated flow meter and feed line from an elevated storage tank. Other methods of feeding said defoamer, including the use of a metering pump, manual feeding, and the like will be apparent to those skilled in the art. Other liquids and slurries were transferred by pumping through lines; still other methods of transferring said materials, including gravity flow from elevated tanks and the use of gas pressure to force said materials through lines will be obvious to those skilled in the art. Screw conveyors and elevator buckets were used to transport other solids, including KCl. Such other methods as conveyor belts, gravity feed via chutes, and the like will be readily apparent to those skilled in the art.

What is claimed is:
1. In the process of ammoniating an acidulated phosphate rock to prepare a slurry fertilizer, the improvement comprising:
   (1) forming an acidulated phosphate rock in slurry form by treating phosphate rock with a mixture of nitric and phosphoric acids;
   (2) forming a neutralization mixture by ammoniating acidulated phosphate rock prepared as in (1) to a pH of about 4.5–9; and
   (3) adding acidulated phosphate rock slurry prepared as in (1) and liquid anhydrous ammonia simultaneously and directly to said neutralization mixture prepared as in (2) in separate streams at rates such that the pH of the neutralization mixture is maintained in the range of 4.5–9, thereby to provide a free-flowing, non-caking, non-thixotropic slurry fertilizer.

2. The process according to claim 1 in which the neutralization mixture is a portion of the final slurry fertilizer product and is maintained at a pH of about 4.5–5.5.

References Cited
UNITED STATES PATENTS

| 3,130,039 | 4/1964 | Kohn | 71—43 X |
| 3,179,496 | 4/1965 | Skinner et al. | 71—43 X |
| 3,234,005 | 2/1966 | Smalter | 71—29 |

DONALL H. SYLVESTER, *Primary Examiner.*

R. BAJEFSKY, *Assistant Examiner.*